US007622686B2

(12) United States Patent
Wolfschaffner

(10) Patent No.: US 7,622,686 B2
(45) Date of Patent: Nov. 24, 2009

(54) DEVICE FOR EFFECTING CONTINUOUS GRAVIMETRIC DOSING

(75) Inventor: Hubert Wolfschaffner, Dasing (DE)

(73) Assignee: Pfister GmbH, Augsburg (DE)

( * ) Notice: Subject to any disclaimer, the term of this patent is extended or adjusted under 35 U.S.C. 154(b) by 0 days.

(21) Appl. No.: 10/546,935

(22) PCT Filed: Feb. 25, 2004

(86) PCT No.: PCT/EP2004/001832

§ 371 (c)(1),
(2), (4) Date: Jan. 29, 2007

(87) PCT Pub. No.: WO2004/076988

PCT Pub. Date: Sep. 10, 2004

(65) Prior Publication Data

US 2007/0144791 A1 Jun. 28, 2007

(30) Foreign Application Priority Data

Feb. 25, 2003 (DE) .............................. 203 03 126 U

(51) Int. Cl.
*G01G 11/00* (2006.01)
(52) U.S. Cl. .............................. 177/16; 141/83; 222/77
(58) Field of Classification Search .................. 177/16,
177/17, 121, 122, 145; 222/55, 56, 77; 141/83
See application file for complete search history.

(56) References Cited

U.S. PATENT DOCUMENTS

| 3,603,416 | A | * | 9/1971 | Spurlin | ............................ | 177/1 |
| 4,126,196 | A | * | 11/1978 | Hyer et al. | ................... | 177/121 |
| RE29,944 | E | * | 3/1979 | Hyer et al. | ................... | 177/121 |
| 4,595,125 | A | * | 6/1986 | Alwerud | ....................... | 222/55 |
| 4,615,403 | A | * | 10/1986 | Nakamura | ................ | 177/25.18 |
| 5,044,819 | A | * | 9/1991 | Kilheffer et al. | .............. | 404/72 |
| 5,119,893 | A | | 6/1992 | Jost | | |

(Continued)

FOREIGN PATENT DOCUMENTS

DE  37 21 186 A  1/1988

(Continued)

OTHER PUBLICATIONS

"Feedback Control of Dynamic Systems", Franklin et al., Addison-Wesley Publishing Company, Reading, Massachusetts, pp. 95-100, (c) 1987.*

(Continued)

*Primary Examiner*—Randy W Gibson
(74) *Attorney, Agent, or Firm*—Knobbe Martens Olson & Bear LLP

(57) ABSTRACT

The aim of the invention is to reduce the complexity of installing and placing into operation a device for effecting continuous gravimetric dosing and determining the mass flow rate of free-flowing products with a dosing device (4) and with the determination of the instantaneous mass flow rate before a delivery location (8) by means of a dosing controller (10), whereby the discharge is controlled by varying the rotational speed of a drive (6) of the dosing device (4) by means of a motor controller. The aim of the invention is achieved by virtue of the fact that the dosing device (10) and the motor controller (20) are combined to form a subassembly (G).

10 Claims, 2 Drawing Sheets

U.S. PATENT DOCUMENTS

| | | | |
|---|---|---|---|
| 5,567,919 A * | 10/1996 | Cote | 177/50 |
| 5,802,674 A * | 9/1998 | Barber | 19/105 |
| 5,912,541 A * | 6/1999 | Bigler et al. | 318/600 |
| 6,376,784 B1 * | 4/2002 | Morinaka | 177/121 |
| 6,398,513 B1 * | 6/2002 | Amsler et al. | 417/63 |
| 6,435,169 B1 * | 8/2002 | Vogt | 123/568.23 |
| 6,540,486 B2 * | 4/2003 | Amsler et al. | 417/53 |
| 6,964,550 B2 * | 11/2005 | Hafner | 414/21 |
| 7,147,012 B2 * | 12/2006 | Kaufhold et al. | 141/11 |
| 2003/0122418 A1 * | 7/2003 | Stachowski et al. | 303/155 |
| 2004/0145324 A1 * | 7/2004 | Ross et al. | 318/254 |
| 2007/0095421 A1 * | 5/2007 | Page | 141/83 |
| 2007/0109731 A1 * | 5/2007 | Bergmann et al. | 361/624 |

FOREIGN PATENT DOCUMENTS

| | | |
|---|---|---|
| DE | 39 26 038 A | 3/1990 |
| WO | WO 99/13302 A | 3/1999 |

OTHER PUBLICATIONS

"Digital Control System Analysis and Design", Phillips et al., Prentice-Hall, Inc. Englewood Cliffs, N.J., pp. 254-260, (c) 1984.*

* cited by examiner

DEVICE FOR EFFECTING CONTINUOUS GRAVIMETRIC DOSING

The invention relates to an apparatus for effecting continuous gravimetric dosing and determining the mass flow rate of free-flowing products with a dosing device, especially a dosing rotor with determination of the momentary mass flow rate.

Such a system for continuous gravimetric conveyance and/or dosing of bulk materials is known from WO 99/13302, with a dosing rotor weighfeeder preferably being used. The dosing apparatus following a supply of bulk material is arranged in an enclosed pneumatic conveying section and is supported on load cells. For performing a respective regulation of the desired conveyed quantity per unit of time (conveying strength), a computer-controlled central dosing control system is used, with the weighing signal of weighing cells being used as an input signal and the speed of the dosing rotor and, optionally, the feeder sluice being regulated for the supply of the bulk material.

In this feedback control system, the mass of bulk material acting momentarily in the rotor weighing section is detected in the dosing rotor weighfeeder, with the mass throughput of the bulk material being obtained by multiplication with the angular speed of the dosing rotor. The electronic system of the weighfeeder delays the delivery of the respective weight value of the bulk mass (charge) situated momentarily on the rotor weighing section (measuring section) until a specific pre-control point, so that the angular speed or rotary speed can be varied according to the predetermined setpoint conveying strength shortly before the delivery of the bulk material to the pneumatic conveying line, meaning that the dosing rotor is accelerated or delayed. This leads to a relatively high dosing precision, which has proven to be reliable for the dosing of dusty bulk materials such as the dosing of coal dust in cement rotary kilns or for dosing additives in the purification of flue gases.

A separate dosing computer has been used until now for controlling such gravimetric continuous dosing apparatuses such as dosing belt weighfeeders, dosing rotor weighfeeders or gravimetric batch systems. The evaluation of the weight and speed measurement or similar parameters occurs in the same. A separate frequency converter is mostly used for controlling the speed of the drive. The frequency converter controls the speed of the dosing drive, with the predetermination of the setpoint speed being made by the dosing computer. The transmission of the setpoint speed to the frequency converter occurs by means of serial or parallel data lines in an analog or binary manner. This configuration corresponds to the one of a distributed control system for communication, as a result of which the complexity for installation and start-up is respectively high as a result of the cabling, interfaces, etc.

The invention is therefore based on the object of providing an apparatus for effecting continuous gravimetric dosing and determining the mass flow rate especially of bulk materials with which the installation and start-up work can be reduced substantially.

This object is achieved by an apparatus according to the features of claim 1.

In contrast to the conventional configuration of the electronic dosing system, the function of the dosing computer or the dosing controller is moved to the motor controller (frequency converter). The evaluation of the process-relevant measured values, the calculation of the setpoint speeds for the dosing drive and the control of the dosing drive thus advantageously occur in a single subassembly. The work required for cabling is reduced substantially, as also for interfaces and seals on the individual housings, especially since such dosing apparatuses are mostly used in very dust-contaminated environments.

The following configurations for the subassemblies consisting of dosing control and motor controller in one device are possible. For example, this configuration can be made in a common switch cabinet, with the measured value acquisition system communicating with a separate measuring amplifier with the combined motor-dosing control system. Preferably, the configuration or integration of the subassembly consisting of dosing and motor controller is made directly on the dosing device, with the measured value acquisition system also being capable of communicating with a separate measuring amplifier with the combined motor-dosing controller. Preferably, the subassembly of the combined motor-dosing controller is directly integrated in the drive motor, with the measured value acquisition system communicating there with a separate measuring amplifier with the combined motor-dosing controller. The measured value acquisition system can also be integrated in the motor-dosing controller. The integration again preferably occurs directly in the dosing apparatus.

Further preferred embodiments are the subject matter of the subclaims, with the possibility of simplified configuration being of special advantage in particular.

The embodiment is explained and described in closer detail by reference to the enclosed drawings, wherein.

Figure 1:
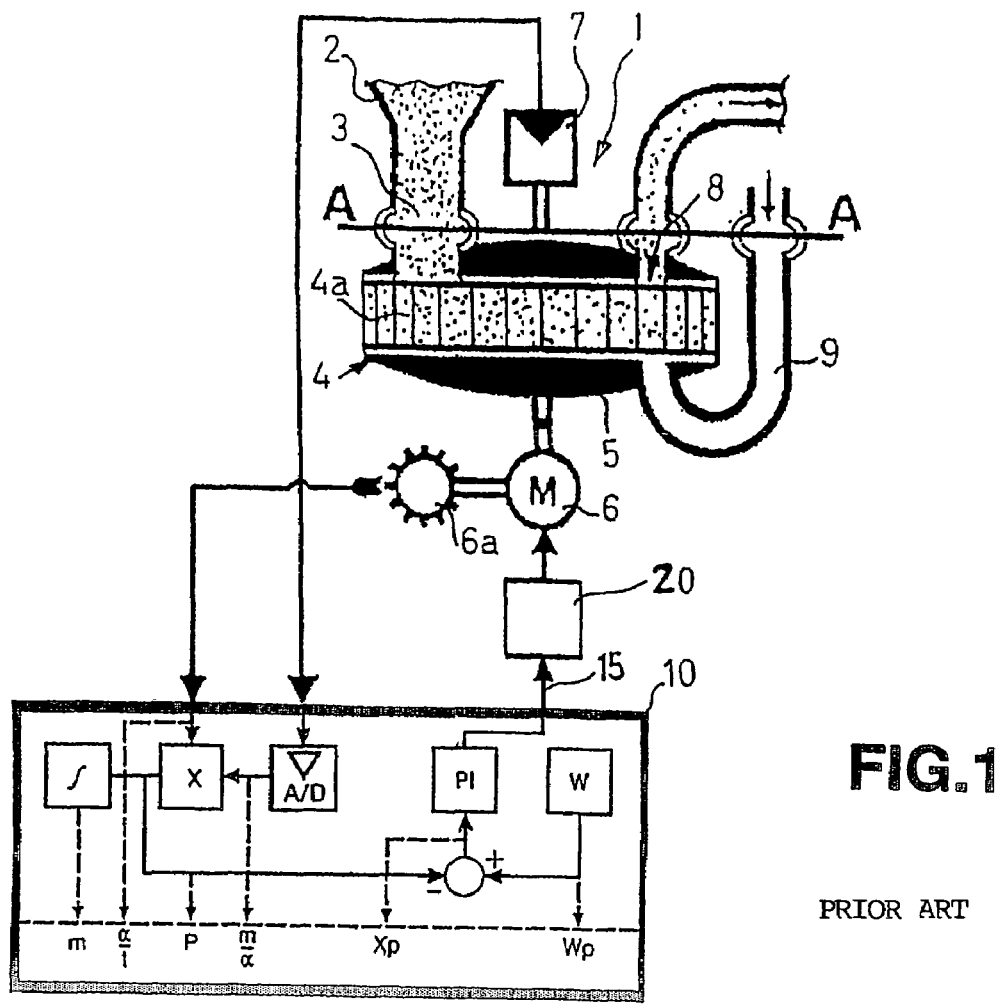
FIG. 1 shows a schematic view of an apparatus for effecting continuous gravimetric dosing of bulk materials, comprising a dosing rotor as a dosing apparatus.

FIG. 1 shows an apparatus 1 for effecting continuous gravimetric dosing and determining the mass flow rate, with the conveyed material which is to be dosed according to an adjustable setpoint conveying strength and is especially a free-flowing bulk material being supplied from a bunker or silo 2 by means of a feeder 3. The conveyed material reaches a dosing apparatus 4 which is arranged within a housing 5 and thus defines a weighing section of approx. 300° angle of rotation up to a delivery point 8. The dosing apparatus 4 is arranged here preferably as a dosing rotor 4a. Said dosing rotor 4a is held on a swivel axis A-A guided laterally of the housing 5 and is driven by a speed-controlled electric motor as a drive 6. The housing 5 of the dosing rotor 4a is supported on a load cell in a limited pivoting movable manner. The supporting moment on the load cell 7 arranged spaced from the swivel axis A-A is directly proportional to the mass flow rate which is transported via the weighing section of the dosing rotor 4a from the feeder 3 to the delivery point 8.

Figure 2:
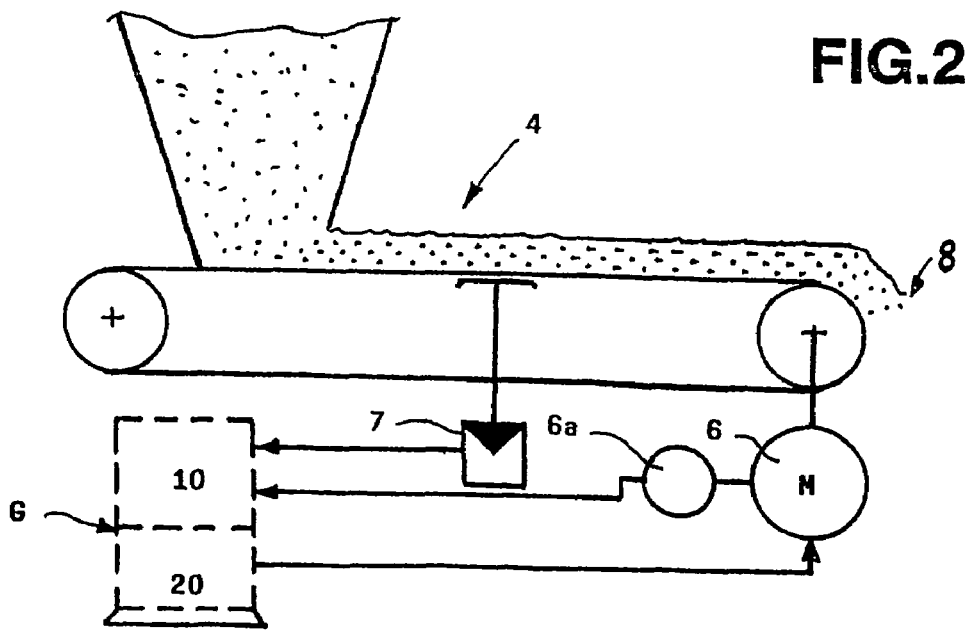
FIG. 2 shows a schematic view of a dosing belt weighfeeder as a dosing apparatus.
Figure 3:
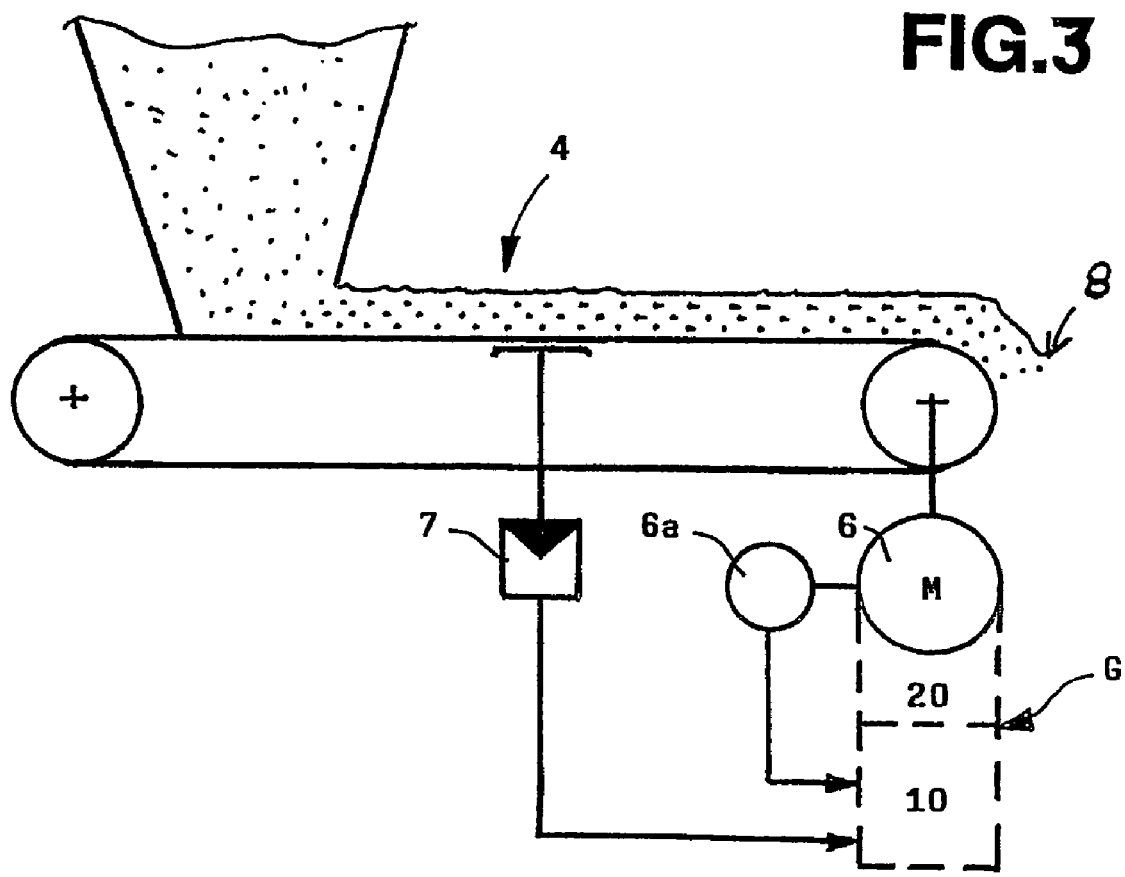
FIG. 3 shows a modified embodiment of the dosing belt weighfeeder according to FIG. 2.
Figure 4:
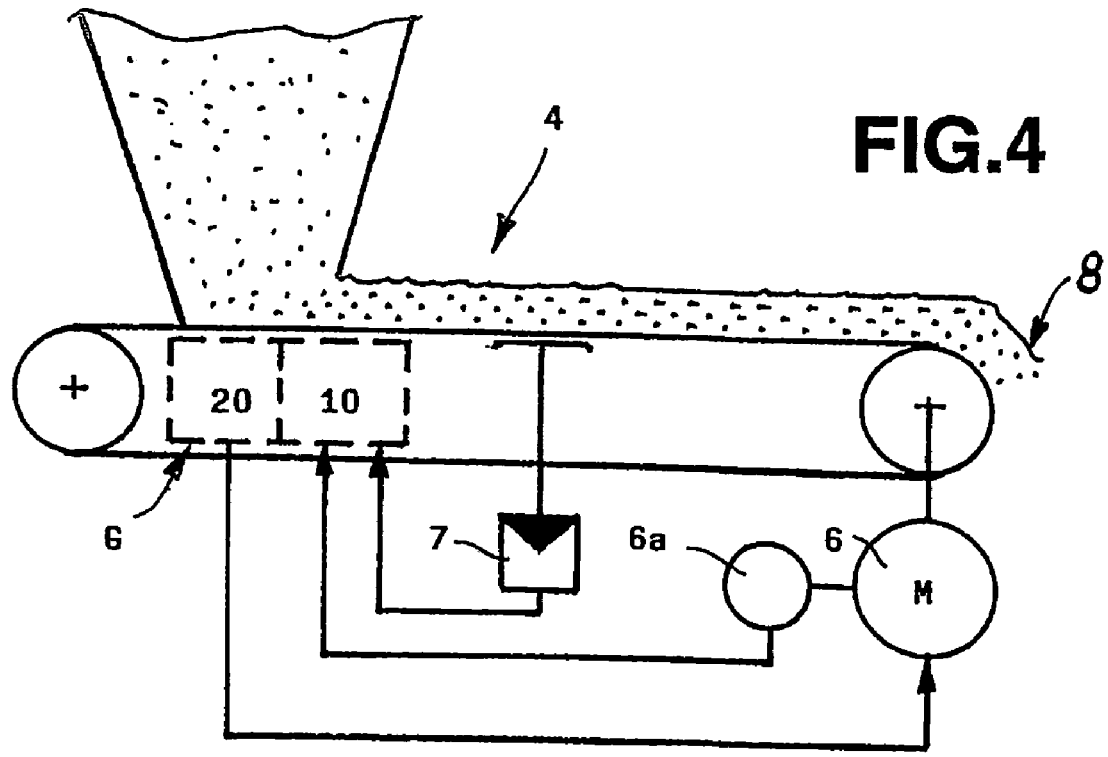
FIG. 4 shows a further embodiment of the dosing apparatus.

A blow-out line 9 opens towards the delivery point 8 at the lower end of housing 5. The load cell 7 and a tachometer generator 6a of the drive 6 are connected with an electronic dosing controller 10 which thus determines the momentary mass flow rate X by multiplication from momentary loading and speed/angular speed and places the same in relationship to the set setpoint conveying strength W, and which triggers the drive motor 6 of the dosing rotor 4a via a Pi-controller, a control line 15 and a motor controller 20, and especially a frequency converter, in order to vary the speed or angular velocity. This open-loop or closed-loop control is generally used to keep the set conveying strength constant. If there is a minus deviation (e.g. −0.2%) in the dosing apparatus 4, the angular velocity of the dosing rotor 4 is increased by the respective value in order to keep constant the conveying strength X, which is in this case +0.2%, as is generally known from the control path indicated in FIG. 1. A similar dosing controller 10 is also provided in the subsequent embodiments provided according to the novel configuration and as shown in FIGS. 2 to 4. This dosing controller 10 however is joined directly with the motor controller 20 into a subassembly G in accordance with the novel configuration.

A relevant aspect in this connection is that by joining or coupling the dosing controller 10 with the motor controller 20 (which is mostly a frequency converter), the amount of cabling and the sealing efforts can be reduced substantially, so that overall the constructional efforts for the dosing apparatus 4 can be reduced substantially (which in this case is shown in FIGS. 2 to 4 for a schematically shown dosing weighfeeder). Moreover, the data exchange in the dosing apparatus 4, especially the signal flow with the parameters such as rotational speed, number of revolutions, weighing signals from the load cell 7, etc. can be accelerated. As a result, the speed control can be enabled without virtually any reaction time by the dosing controller 10 with motor controller 20 coupled into a subassembly by omission of the signal line 15 as shown in FIG. 1. The comparator subassemblies or integration circuits as indicated in FIG. 1 for substantial minimization of system deviations are also provided in the embodiments according to the novel configurations. If the control value supplied to the drive motor 6 at the precontrol point P (cf. FIG. 1 and the aforementioned WO 99/13302 of the applicant) was insufficient as a result of the overall inertia for the desired conveying strength, the required time frame for acceleration/braking of the dosing device 4 with timely achievement of the triggered speed can be achieved at the delivery point 8 by moving forward the precontrol point P relative to the delivery point 8, and thus the setpoint mass flow rate W can be controlled or adjusted with the dosing apparatus 4. The precontrol point P should lie as close as possible to the delivery point 8, so that drives 6 with strong acceleration or braking and fast-responding frequency converters as the motor controller 20 are appropriate.

FIG. 3 shows a preferred embodiment of the apparatus for effecting continuous gravimetric dosing and determining the mass flow rate, with the subassembly G with combined dosing controller/motor controller 10/20 being directly connected with the drive motor 6 of the dosing apparatus 4, which subassembly has a configuration otherwise as is shown in FIG. 1 and FIG. 2. Depending on the momentary charging of the dosing belt, the start or starting point of the speed regulation of the drive motor 6 can thus be varied by taking into account the respective inertia in order to maintain the setpoint conveying strength W. Geometric parameters which are constructionally predetermined such as dead weight and length of the dosing belt can be stored in the dosing controller 10, so that in the case of an actual angular speed as measured by the tachometer generator 6a or an pulse generator it is possible to make precise statements as to when the load as determined by the dosing apparatus 4 with the load cell 7 will arrive at the delivery point 8 and a respective readjustment by acceleration/reduction of the conveying speed can be made.

Although a dosing rotor and a dosing belt weighfeeder were described herein as a dosing apparatus 4, the described open-loop and closed-loop control apparatus can also be used in a dosing screw conveyor or similar dosing devices for increasing the short-term dosing precision at the delivery or ejection point since considerable moments of inertia can be present in these cases too. The subassembly G can also be installed or integrated within the dosing apparatus 4, as is indicated in FIG. 4 by way of example of the intermediate space between the strands of the dosing belt weighfeeder. An especially compact configuration can thus be realized.

The invention claimed is:

1. An apparatus for effecting continuous gravimetric dosing and determining the mass flow rate of free-flowing products, the apparatus comprising:
 a feeder containing a free-flowing bulk material; and
 a dosing apparatus configured to control a mass flow rate of the free-flowing bulk material toward a delivery point with determination of the momentary mass flow rate before the delivery point by means of a dosing controller, with the delivery control occurring by changing the speed of a drive of the dosing apparatus by means of a motor controller, wherein the dosing controller and the motor controller are joined into a subassembly, and the subassembly is arranged within the dosing apparatus.

2. The apparatus according to claim 1, wherein the subassembly is coupled with the drive of the dosing apparatus.

3. The apparatus according to claim 1 or 2, wherein the drive of the dosing apparatus comprises a speed detection device, the speed detection device being coupled with the dosing controller.

4. The apparatus according to claims 1 or 2, wherein the dosing controller comprises at least one integration circuit which respectively detects an optionally occurring deviation at or shortly after the delivery point and respectively corrects the control value of the dosing controller.

5. The apparatus according to claim 4, wherein a comparator component is provided in the dosing controller for changing the position of a precontrol point.

6. The apparatus according to claim 1 or 2, wherein the motor controller is configured as a frequency converter or thyristor control device.

7. The apparatus according to claim 1 or 2, wherein the drive is configured as a motor selected from the group consisting of an asynchronous, a synchronous, a vector, and a reluctance motor.

8. The apparatus according to claim 3, wherein the speed detection device comprises a tachometer generator.

9. The apparatus according to claim 3, wherein the dosing apparatus comprises a separate speed detection device.

10. The apparatus according to claim 3, wherein the speed detection device comprises a friction wheel or a pulse generator.

* * * * *

UNITED STATES PATENT AND TRADEMARK OFFICE
CERTIFICATE OF CORRECTION

| | | |
|---|---|---|
| PATENT NO. | : 7,622,686 B2 | Page 1 of 1 |
| APPLICATION NO. | : 10/546935 | |
| DATED | : November 24, 2009 | |
| INVENTOR(S) | : Hubert Wolfschaffner | |

It is certified that error appears in the above-identified patent and that said Letters Patent is hereby corrected as shown below:

At Column 2, Line 62, please delete "Pi-controller," and insert therefore --PI-controller,--.

Signed and Sealed this

Twenty-ninth Day of June, 2010

David J. Kappos
*Director of the United States Patent and Trademark Office*